(12) United States Patent
Ellison et al.

(10) Patent No.: US 8,147,133 B2
(45) Date of Patent: Apr. 3, 2012

(54) TOP LOADED TWIN CELL CALORIMETER SYSTEM WITH REMOVABLE REFERENCE

(75) Inventors: Daniel Ellison, Odon, IN (US); Ryan Ubelhor, Bloomington, IN (US)

(73) Assignee: The United States of America as represented by the Secretary of the Navy, Washington, DC (US)

( * ) Notice: Subject to any disclaimer, the term of this patent is extended or adjusted under 35 U.S.C. 154(b) by 408 days.

(21) Appl. No.: 12/471,694

(22) Filed: May 26, 2009

(65) Prior Publication Data

US 2010/0303124 A1  Dec. 2, 2010

(51) Int. Cl.
*G01K 17/08* (2006.01)
(52) U.S. Cl. ............. 374/31; 374/12; 374/208; 374/29; 436/147; 422/51
(58) Field of Classification Search ............. 374/31–39, 374/141, 208, 10–12, 29; 436/147; 422/51
See application file for complete search history.

(56) References Cited

U.S. PATENT DOCUMENTS

| 3,834,873 | A | * | 9/1974 | Picker | 436/147 |
| 3,867,097 | A | | 2/1975 | Vurek | |
| 4,255,961 | A | * | 3/1981 | Biltonen et al. | 374/11 |
| 5,098,196 | A | * | 3/1992 | O'Neill | 374/11 |
| 5,295,745 | A | * | 3/1994 | Cassettari et al. | 374/10 |
| 5,813,763 | A | | 9/1998 | Plotnikov et al. | |
| 6,230,499 | B1 | | 5/2001 | Hohne | |
| 6,422,742 | B1 | * | 7/2002 | Kinoshita | 374/10 |
| 6,485,173 | B2 | | 11/2002 | Plotnikov et al. | |
| 6,561,692 | B2 | * | 5/2003 | Danley | 374/29 |
| 6,583,391 | B2 | * | 6/2003 | Jorimann et al. | 219/497 |
| 6,994,467 | B2 | | 2/2006 | Suurkuusk et al. | |
| 7,455,449 | B2 | * | 11/2008 | Nishimura | 374/12 |
| 7,677,795 | B2 | * | 3/2010 | Schick | 374/10 |
| 7,802,916 | B2 | * | 9/2010 | Teramoto | 374/11 |
| 2011/0164652 | A1 | * | 7/2011 | ReFalo et al. | 374/31 |

OTHER PUBLICATIONS

TA Instruments, Microcalorimetry brochure, available at http://www.tainstruments.com/pdf/brochure/TAMBrochure.pdf, 2008, 60 pgs.
TA Instruments, Microcalorimeter, available at http://www.tainstruments.com/main.aspx?id=220&n=1&siteid=11, 2007, 1 pg.

* cited by examiner

*Primary Examiner* — Gail Verbitsky
(74) *Attorney, Agent, or Firm* — Christopher A. Monsey

(57) ABSTRACT

A measured system for use with a calorimeter and related methods of operation.

29 Claims, 6 Drawing Sheets

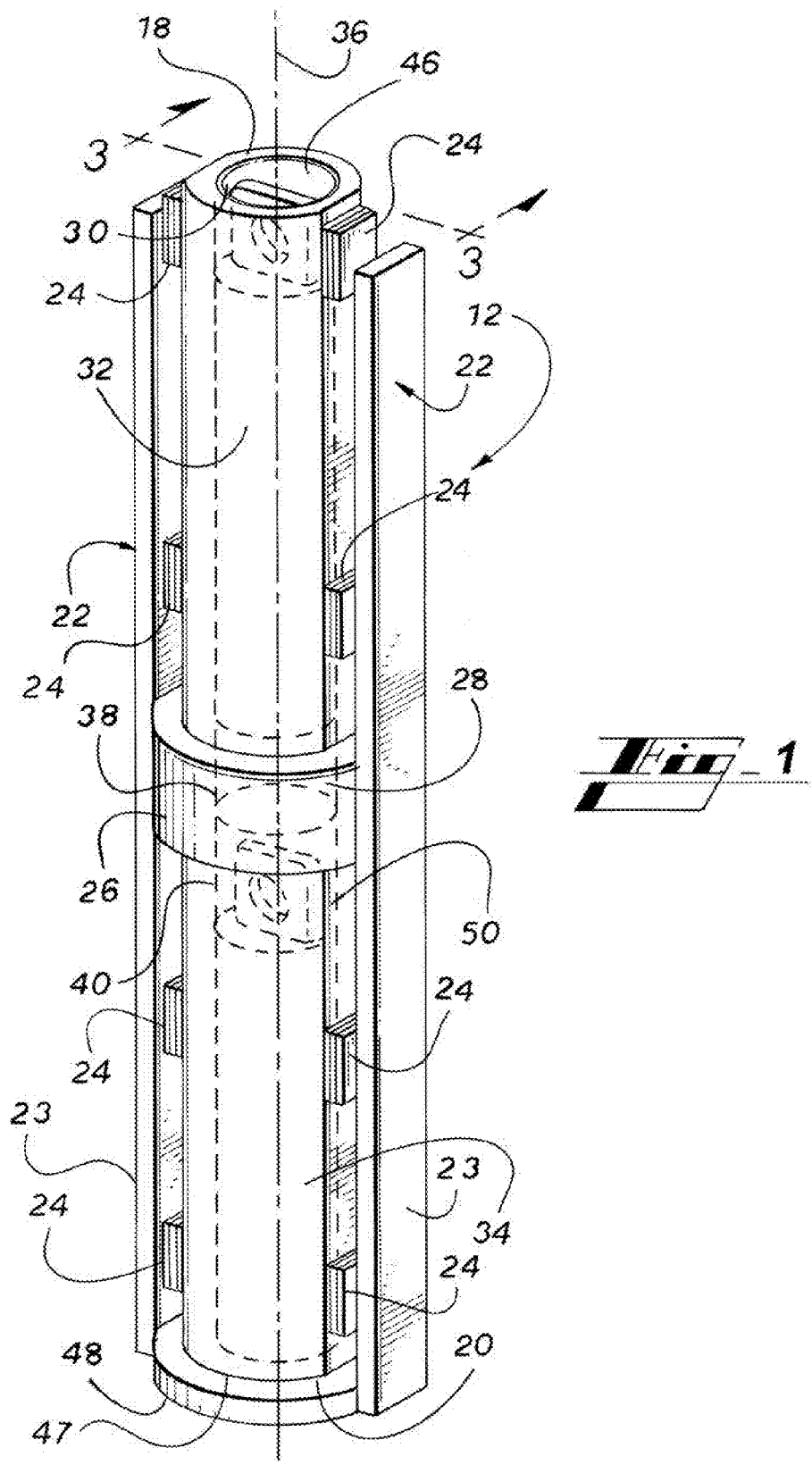
Fig_1

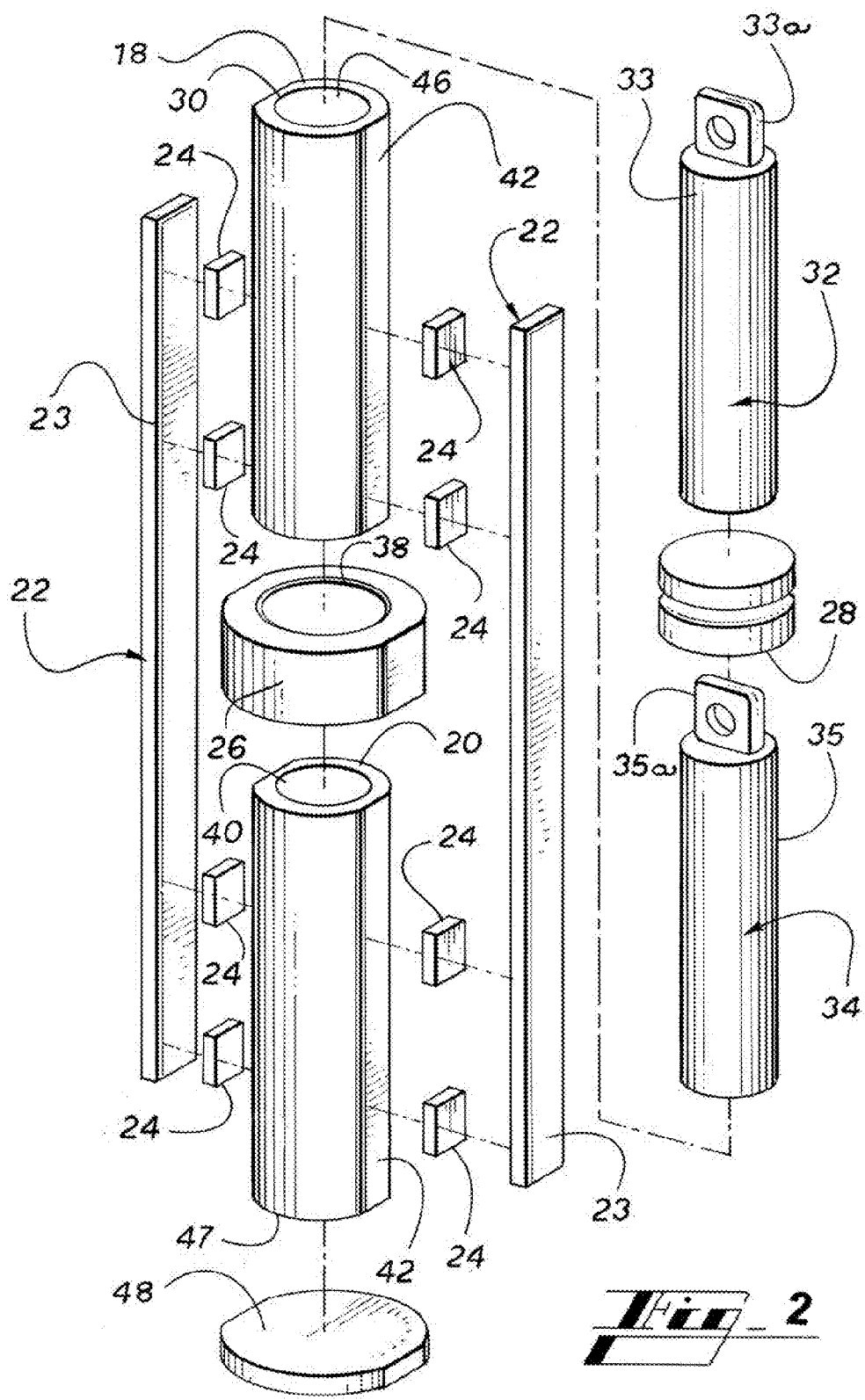

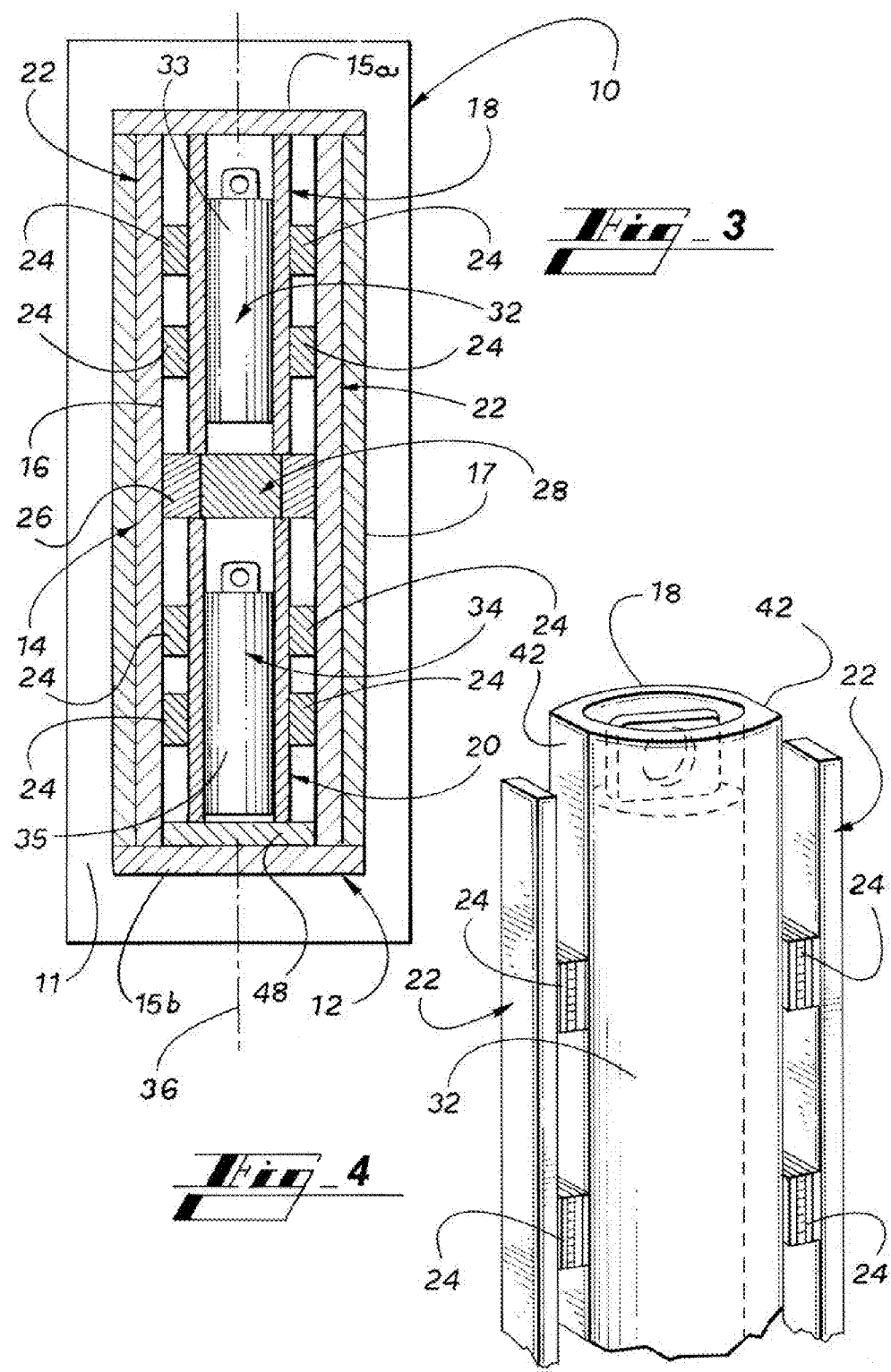

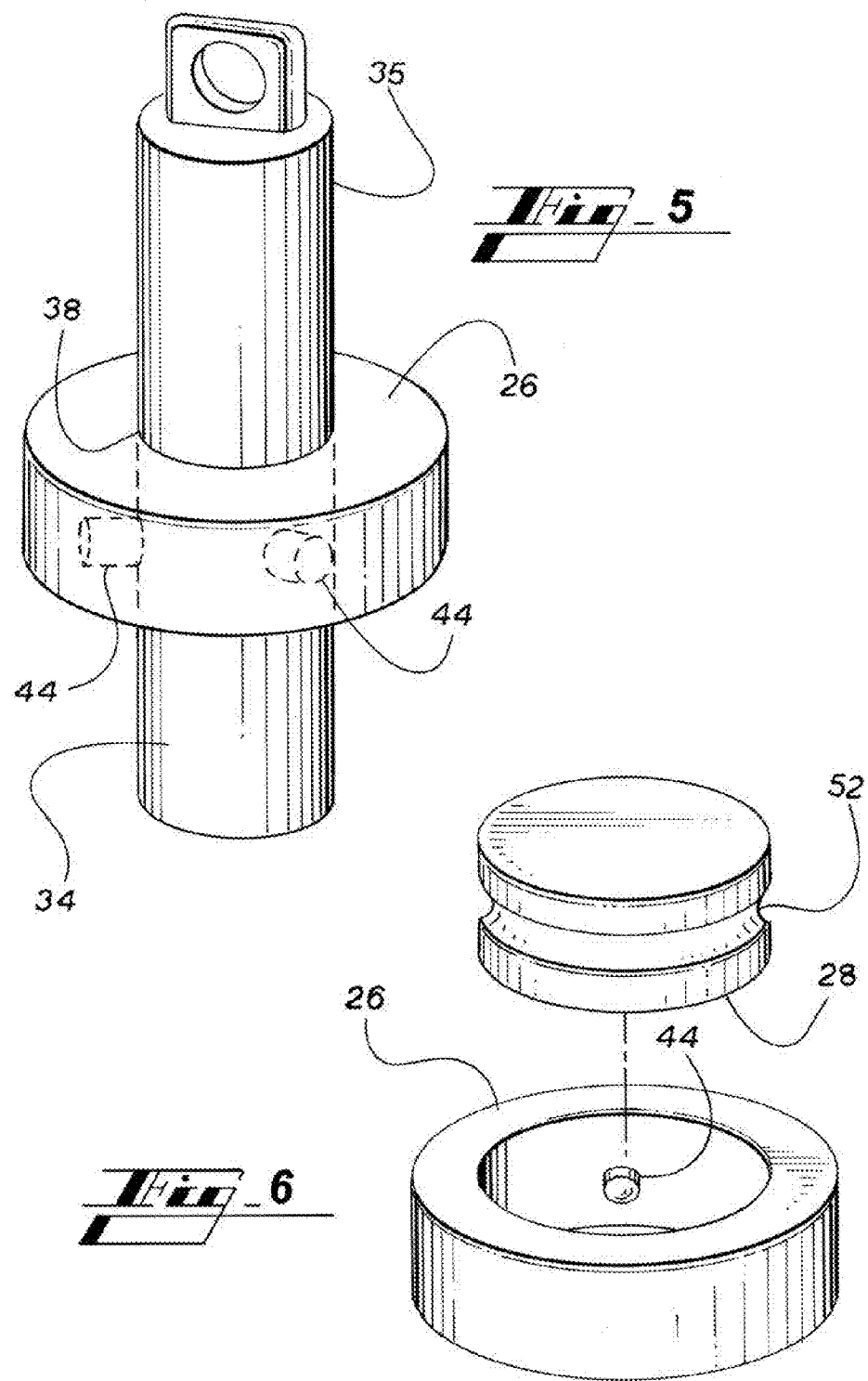

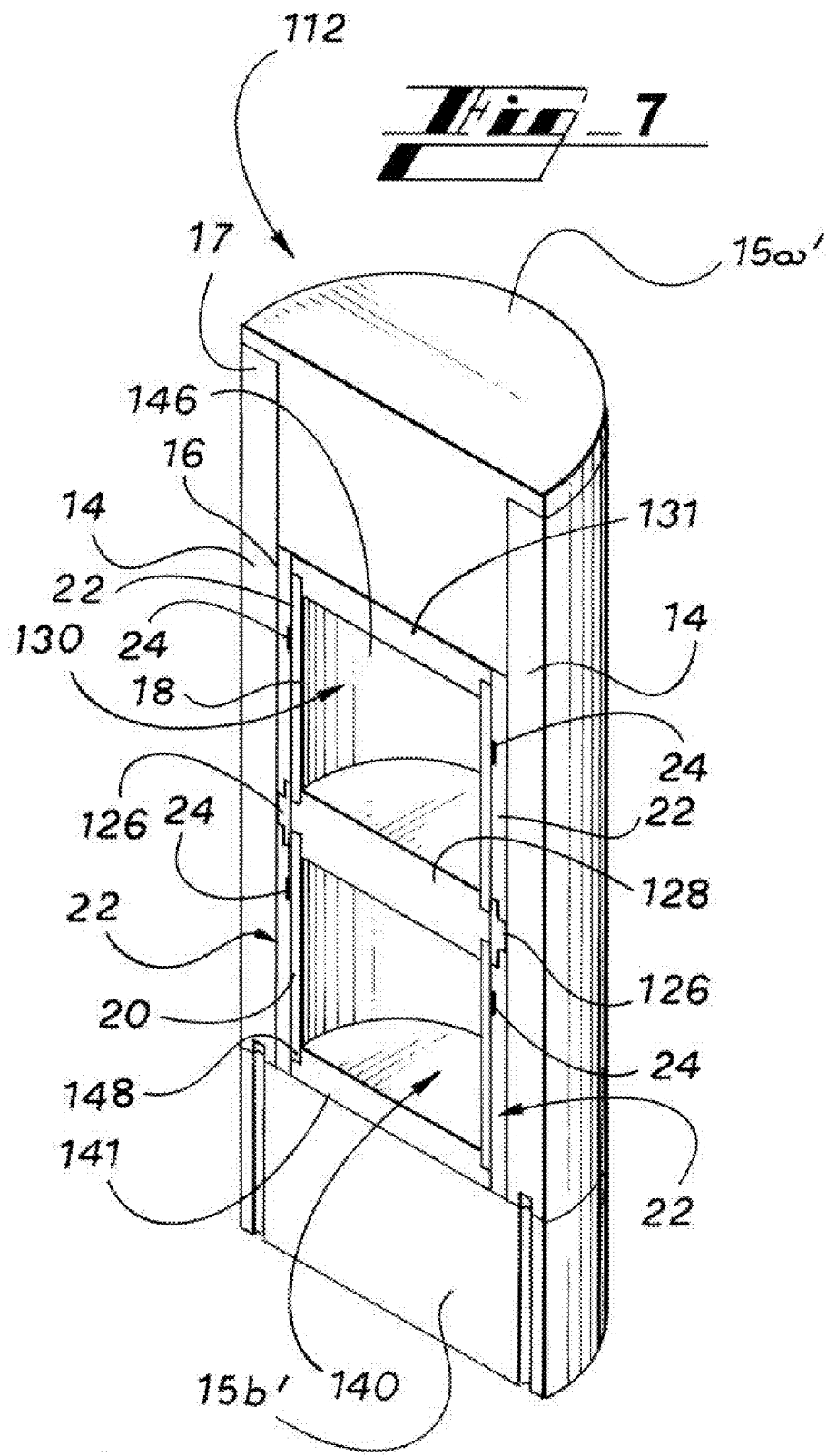

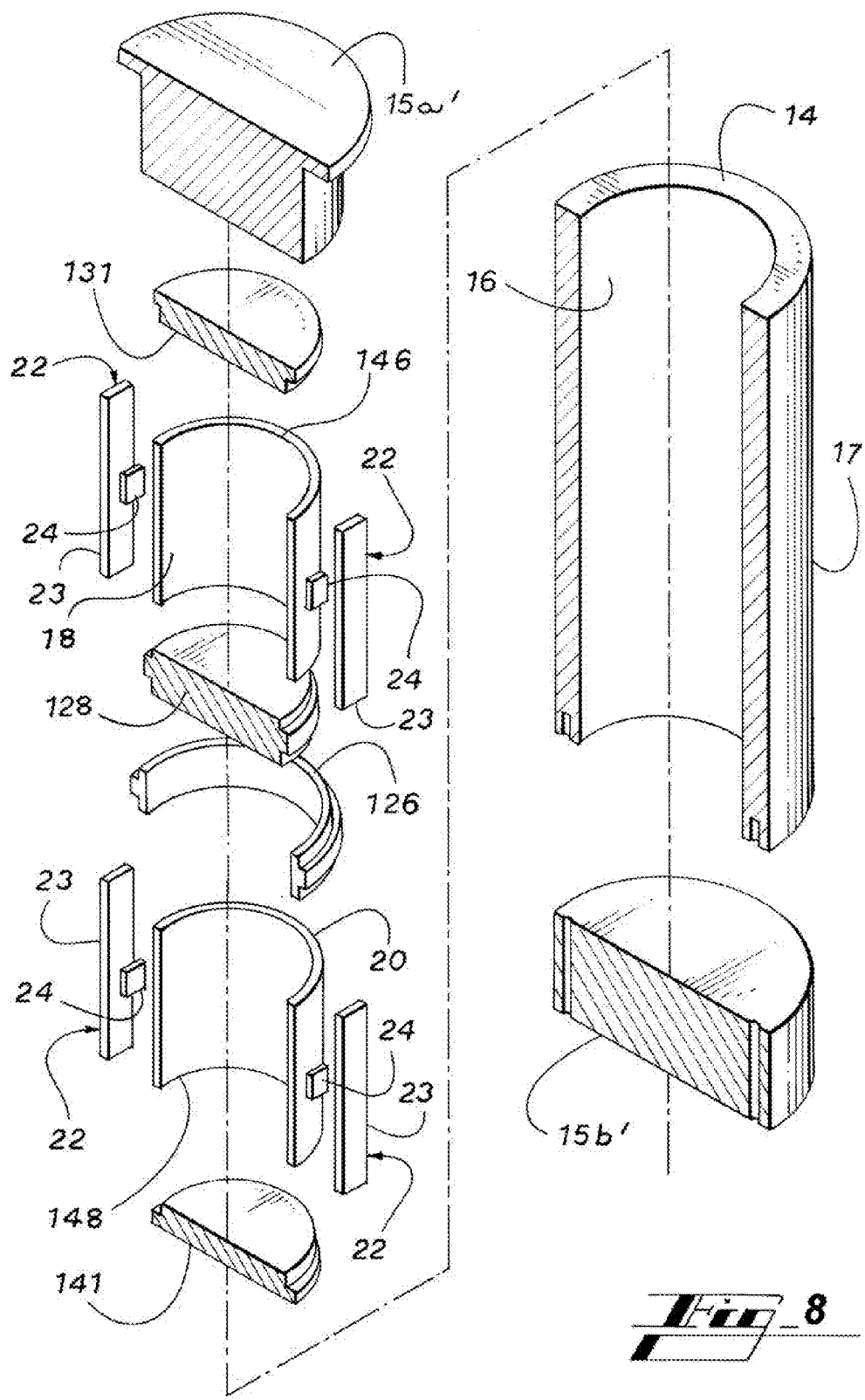

US 8,147,133 B2

TOP LOADED TWIN CELL CALORIMETER SYSTEM WITH REMOVABLE REFERENCE

STATEMENT REGARDING FEDERALLY SPONSORED RESEARCH OR DEVELOPMENT

The invention described herein includes contributions by one or more employees of the Department of the Navy made in performance of official duties and may be manufactured, used and licensed by or for the United States Government for any governmental purpose without payment of any royalties thereon.

BACKGROUND AND SUMMARY OF THE INVENTION

The present invention relates generally to calorimetry instruments and related methods of operation and, more particularly, to a measured system for use with a calorimeter.

Calorimetry provides a direct method of measuring changes in thermodynamic properties of materials. Calorimeters generally include twin cell instruments in which properties of a test substance in a sample cell is compared to an equal quantity of reference substance in a reference cell. Measured differences between the properties of the sample cell and the reference cell, such as temperature or heat capacity, can be contributed to the presence of the test substance in the sample cell.

As noted above, most calorimeters include a reference cell and a sample cell. Calorimeters typically position the reference cell and the sample cell in a laterally spaced, parallel relationship. Typically, thermal sensors are positioned between the reference cell and the sample cell and are used to measure the difference in temperature between the reference cell and the sample cell.

According to an illustrative embodiment, the present disclosure provides a measured system for use with a calorimeter. The measured system includes a cell defining a cell cavity having a longitudinal axis, and a heat sensing module configured to be located within the cell cavity. The heat sensing module includes a support and a heat sensor operably coupled to the support. The measured system further includes a sample holder configured to be located within the cell cavity. The sample holder defines a sample cavity configured to hold a sample. The measured system also includes a reference holder configured to be located within the cell cavity. The reference holder defines a reference cavity configured to hold a reference. The measured system further includes a separator configured to be located longitudinally between the sample holder and the reference holder. The separator defines a separator opening configured to permit passage of the reference therethrough. The measured system includes an insert configured to be removably supported within the separator opening.

According to another illustrative embodiment, the present disclosure includes a measured system for use with a calorimeter. The measured system includes a cell having a longitudinal axis, and a sample holder configured to be positioned along the longitudinal axis. The sample holder defines a sample cavity configured to hold a sample configured to be measured by the calorimeter. The measured system further includes a reference holder configured to be positioned along the longitudinal axis. The reference holder defines a reference cavity configured to hold a reference. The measured system also includes a separator configured to be located longitudinally between the sample holder and the reference holder, and configured to provide thermal insulation between the sample holder and the reference holder. The measured system further includes at least one heat sensing module configured to be supported within the cell holder. The heat sensing module includes a heat sensor laterally spaced from the longitudinal axis.

According to a further illustrative embodiment, the present disclosure includes a method of using a measured system with a calorimeter. The method includes the step of providing a cell holder having a longitudinal axis, the cell holder defining an open end. The method further comprises the step of providing a thermally insulating separator within the cell. The method also comprises the steps of loading a reference through the open end of the cell by moving the reference along the longitudinal axis, and loading a sample through the open end of the cell by moving the sample along the longitudinal axis. The method further comprises the step of measuring thermal characteristics of the sample by the calorimeter.

BRIEF DESCRIPTION OF THE DRAWINGS

The above-mentioned and other features of this disclosure, and the manner of attaining them, will become more apparent and the disclosure itself will be better understood by reference to the following description of embodiments of the disclosure taken in conjunction with the accompanying drawings, wherein:

FIG. 1 is a perspective view in partial schematic of a measured system according to an illustrative embodiment of the present disclosure;

FIG. 2 is an exploded view of the measured system of FIG. 1;

FIG. 3 is a diagrammatic cross-sectional view of a calorimeter and the measured system of FIG. 1;

FIG. 4 is a detail exploded view in partial schematic of the measured system of FIG. 1;

FIG. 5 is a perspective representation of an illustrative association between the separator and the reference holder of FIG. 1;

FIG. 6 is a perspective representation of an illustrative association between the separator and the insert of FIG. 1;

FIG. 7 is a cross-sectional view in partial schematic of a measured system according to another illustrative embodiment of the present disclosure; and FIG. 8 is an exploded perspective view in cross-section of the measured system of FIG. 7.

Corresponding reference characters indicated corresponding parts throughout the several views. Although the drawings represent embodiments of the present disclosure, the drawings are not necessarily to scale and certain features may be exaggerated in order to better illustrate and explain the present disclosure. Although the exemplification set out herein illustrates embodiments of the disclosure, in several forms, the embodiments disclosed below are not intended to be exhaustive or to be construed as limiting the scope of the disclosure to the precise forms disclosed.

DETAILED DESCRIPTION OF THE DRAWINGS

The embodiments disclosed below are not intended to be exhaustive or limit the disclosure to the precise forms disclosed in the following detailed description. Rather, the embodiments are chosen and described so that others skilled in the art may utilize their teachings.

Referring initially to FIG. 1, a measured system 12 is shown according to an illustrative embodiment of the present disclosure. Measured system 12 is configured to be used with a calorimeter 10 (FIG. 3). More particularly, measured system 12 may be received within a longitudinally extending cell cavity 16 defined by a cell 14. Cell 14 may be received within a fluid, such as aqueous buffer or oil 11, of calorimeter 10. Calorimeter 10 may use measured system 12 as part of any calorimetry application. As illustrated in FIG. 3, cell 14 may include upper and lower end walls or caps 15a and 15b typically supported by opposing ends of a cylindrical sidewall 17 and is illustratively made of aluminum or other thermally conductive material. Measured system 12 is shown in FIG. 1 without cell 14 defining cell cavity 16 in order to illustrate additional detail.

Measured system 12 is shown as including a sample holder 18, a reference holder 20, heat sensing modules 22 including heat sensors 24, a separator 26, and an insert 28. Sample holder 18, reference holder 20, heat sensing modules 22, separator 26 and insert 28 are each configured to be located within cell cavity 16 (FIG. 3). Sample holder 18, separator 26, and reference holder 20 are each illustrated as being generally cylindrical. Sample holder 18, reference holder 20, heat sensing modules 22, separator 26 and insert 28 are configured to be arranged as illustrated in FIG. 1. Cell 14 (FIG. 3), sample holder 18 and reference holder 20 are made illustratively of any heat conductive material with low heat capacity, such as aluminum or copper.

As illustrated in FIG. 1, sample holder 18, separator 26, and reference holder 20 are shown in a serial arrangement. Moreover, sample holder 18, separator 26, and reference holder 20 are each shown as being coaxially disposed along longitudinal axis 36. Sample holder 18, separator 26, and reference holder 20 may also be described as being in a stacked arrangement and/or a top-to-bottom orientation.

With reference to FIGS. 1 and 2, sample holder 18 defines open-end 46. Open-end 46 is configured to receive sample 32, insert 28, and/or reference 34. Similarly, reference holder 20 defines open-end 47. Open-end 47 is configured to perform a similar function as open-end 46, for example, by receiving reference 34. Flexibility by including open ends 46 and 47 in holders 18 and 20 provides interchangeable functionality. Plugs 48, illustratively disc shaped caps similar to plugs 131 and 141 (FIG. 7), may be used to seal or close ends 46 and 47.

Sample 32 as defined herein includes container or vessel 33 which contains the sample material, typically an analyte (not shown). The analyte may be any substance or chemical substituent which is undergoing analysis. In one illustrative embodiment, the analyte is ammunition. Vessel 33 may be of the type known in the art and includes a cylindrically shaped body. Vessel 33 may be formed of a thermally conductive material, such as aluminum. Vessel 33 may also be formed of stainless steel or glass to prevent potential chemical reactions with the sample material. A tab 33a may be provided on upper end of vessel 33 to facilitate manipulation by a tool (not shown).

Sample holder 18, separator 26, and reference holder 20 each define an opening or cavity 30, 38, 40. The openings or cavities 30, 38, 40 are co-axially aligned along longitudinal axis 36. Sample holder 18 illustratively comprises a cylindrical body defining a sample cavity 30 which is configured to receive sample 32. Sample cavity 30 is also configured to allow insert 28 and reference 34 to pass through sample holder 18 along longitudinal axis 36. Reference holder 20 likewise defines a reference cavity 40 which is configured to receive reference 34.

As illustrated in FIG. 1, separator 26 is located between sample holder 18 and reference holder 20. Separator 26 may be comprised of any material or combinations of material that will serve as a thermal insulator (i.e., help minimize heat exchange between sample holder 18 and reference holder 20).

Separator 26 and insert 28 are illustratively made of material with the following characteristics: heat stable, does not greatly change physical dimensions over a wide range of temperatures, relatively high heat capacity. As illustrative embodiments, separator 26 and insert 28 may be made of material such as steel or polyaryletheretherketone (PEEK).

Separator 26 defines a separator opening or cavity 38. Separator opening 38 extends through the separator 26 to provide communication between sample cavity 30 and reference cavity 40. Moreover, separator opening 38 is configured to allow sample 32, insert 28, and/or reference 34 to pass through separator 26 from sample holder 18.

Reference holder 20 illustratively comprises a cylindrical body defining a reference cavity 40. Reference cavity 40 is in selective communication with sample cavity 30 through separator opening 38. Reference cavity 40 is configured to hold reference 34. Reference 34 as defined herein includes container or vessel 35 containing the reference material, which is generally a material in which a comparison is made to the analyte received within the sample holder 18. In one embodiment, reference 34 may include ammunition without one or more substituents such as propellant, fuel, or oxidizer. Vessel 35 may be of the type known in the art and includes a cylindrically shaped body. Vessel 35 may be formed of a thermally conductive material, such as aluminum. Vessel 35 may also be formed of stainless steel or glass to prevent potential chemical reactions with the reference material. A tab 35a may be provided on an upper end of the vessel 35 to facilitate manipulation by a tool (not shown).

As described in greater detail below, separator opening 38 is also configured to hold insert 28. Similarly, insert 28 helps minimize heat exchange between sample 32 and reference 34 and to separator 26.

As noted above, measured system 12 includes sample holder 18, separator 26, and reference holder 20, which can either be created as a single unitary structure or any plurality of components. Cavities 30, 38, and 40 are illustrated as in communication with each other. Cavities 30, 38, and 40 are also illustrated as having a substantially similar inner diameter in order to define common passageway 50 aligned with longitudinal axis 36. Measured system 12, manufactured as a single integral unit, combines sample cavity 30, separator opening 38, and reference cavity 40 into common passageway 50. As illustrated in FIG. 1, common passageway 50 provides access through measured system 12 through either end 46 and 47.

As illustrated in FIG. 2, measured system 12 may be viewed as a top-loaded or bottom-loaded cell. Measured system 12 generally defines common passageway 50 and open-ends 46 and 48 to allow the insertion or removal of sample 32, insert 28, and reference 34 along longitudinal axis 36.

Measured system 12 illustrates thermal heat sensors 24 laterally spaced from longitudinal axis 36. Similarly, measured system 12 illustrates thermal heat sensors 24 outside of common passageway 50 intermediate holders 18, 20 and longitudinally extending supports 23. Thermal heat sensors 24 may also be positioned within common passageway 50 within the scope of this disclosure.

Supports 23 of heat sensing modules 22 may be comprised of thermally conductive material for transferring heat from the aqueous buffer 11 and cell 14 to heat sensors 24. Heat sensing modules 22 are located within cell cavity 16 (FIG. 3) of cell 14. Cell 14 may define cutouts (not shown) to provide space for supports 23 and heat sensors 24 within cell cavity 16. Heat sensors 24 are illustrated as having a generally cuboid shape. Heat sensing modules 22 are configured to be adjacent to cell 14 (FIG. 3) to facilitate heat transfer, and are illustrated as being lateral to sample holder 18, separator 26, and reference holder 20. Heat sensing modules 22 include support 23 defining an inner surface and an outer surface where the outer surface is configured to be located adjacent to cell 14, and the inner surface is configured to be adjacent to heat sensor 24.

Heat sensing module 22 includes support 23 configured to support heat sensors 24 and which may extend essentially the longitudinal length of measured system 12. As illustrated, two diametrically opposed supports 23 are shown. However, any number of supports 23 and cooperating heat sensors 24 may be utilized.

Illustratively, diametrically opposed heat sensors 24 are located between a respective support 23 and either sample holder 18 or reference holder 20. Furthermore, it is also envisioned that a number of heat sensors 24 can be supported along one support 23. As illustrated in FIGS. 3 and 4, heat sensors 24 are located adjacent to either sample holder 18 or reference holder 20 and supported by supports 23. Four heat sensors 24 are shown adjacent to sample holder 18 and supported by two supports 23. Heat sensor 24 (also described as thermoelectric module 24) may be a Peltier device or an array of Peltier devices operated by a controller. Heat sensors 24 are available in a great variety of sizes, shapes, operating currents, operating voltages and ranges of heat pumping capacity.

Heat sensor 24 illustratively operates as a power generator by converting an applied temperature gradient (waste heat) between holder 18, 20 and support 23 into electrical power by using the known Seebeck effect. The generated electrical power is then sent to a data acquisition device and finally to a computer to then record the voltage signal. The voltage signals of the sample holder 18 and reference holder 20 are then compared to each other.

Now referring to FIG. 4, sample holder 18, and heat sensing modules 22, including heat sensors 24, are shown in greater detail along with sample 32. As further detailed herein, sample 32 is generally defined as the vessel 33 containing the sample material. As illustrated in FIG. 4, sample holder 18 generally has a cylindrical shape. In this embodiment, sample holder 18 also defines seats 42, illustratively flat portions. Seats 42 provide space for heat sensing modules 22 within cell cavity 16 of cell 14. As illustrated in FIG. 2, seats 42 extend the length of sample holder 18. More particularly, similar seats or flat portions are illustratively included on separator 26, reference holder 20 and/or plug 48 to allow space for heat sensors 24 of heat sensing modules 22.

As also illustrated in FIG. 4, each heat sensing module 22 may include a plurality of heat sensors 24 adjacent to support 23 and respective holder 18, 20. As illustrated in FIGS. 3 and 4, four heat sensors 24 are supported by each support 23 (two heat sensors 24 between each support 23 and respective holder 18, 20). As such, a total of eight heat sensors 24 are shown. However, the number of heat sensors 24 may vary in the illustrative embodiment.

More particularly, a plurality of heat sensors 24 may be aligned in parallel arrangement within a single heat module 22. For example, a plurality of heat sensors 24 may be stacked longitudinally and laterally within a single heat module 22. It is also envisioned that an increased number of heat sensors 24 increases the sensitivity of measured system 12.

As illustrated in FIG. 5, separator 26 is shown with reference 34 passing through separator opening 38. In this embodiment, separator 26 also includes securing member 44, illustratively a detent pin. As illustrated, securing member 44 is biased towards separator opening 38 and/or longitudinal axis 36 (FIG. 1). In other words, securing member 44 is illustrated as being biased radially-inwardly. Securing member 44 may be biased by any suitable means such as through the use of a spring. As illustrated in FIG. 6, insert 28 is configured to be located within separator opening 38 during operation of measured system 12. Insert 28 defines groove 52 which allows for a detent lock between securing member 44 and groove 52 to retain insert 28 within separator opening 38. It is also envisioned that there are other fastening mechanisms to keep insert 28 located within separator opening 38. Insert 28 may also include a tool engaging feature, such as a threaded aperture or tab, to facilitate manipulation by a tool (not shown).

FIG. 7 shows another illustrative embodiment of the present disclosure, measured system 112. Measured system 112 is configured to perform substantially the same function in substantially the same manner as measured system 12. As such, parts of measured system 112 have been labeled with the same reference characters used in measured system 12.

Cell 14, cell cavity 16, sample holder 18, reference holder 20, heat sensing modules 22, and heat sensors 24 are all illustrated as parts of measured system 112. End walls or caps 15a' and 15b' are similar to end walls 15a and 15b and may be supported by opposing ends of cylindrical sidewall 17.

As illustrated in FIG. 7, measured system 112 also includes separator 126. Unless otherwise noted, separator 126 perform similar functions as separator 26 detailed above. Separator 126 is positioned intermediate heat sensing modules 22 (including heat sensors 24) of sample holder 18 and reference holder 20, respectively. As illustrated, at least a portion of insert 128 is located between sample holder 18 and reference holder 20.

Measured system 112 includes sample holder 18, insert 128, and reference holder 20, the components of which can either be created as a single unitary structure or can be assembled as a plurality of separate components. As illustrated in this embodiment, at least a portion of insert 128 is located between sample holder 18 and reference holder 20. As a unitary structure, sample holder 18, insert 128, and reference holder 20 can be inserted into, and removed out of, cell cavity 16 (FIG. 3). In such an illustrative embodiment, insert 128 is part of a unitary structure including sample holder 18 and reference holder 20.

Within measured system 112, sample holder 18 defines sample cavity 130. Sample cavity 130 provides the same function as sample cavity 30. However, sample cavity 130 is defined by sample holder 18 and insert 128. Sample holder 18 defines open end 146 in communication with sample cavity 130 to provide ingress and egress of sample 32 (FIG. 3). Optional sample plug 131 is configured to close open end 146.

Similarly, reference holder 20 defines open end 148 and reference cavity 140 in communication with open end 148. Reference cavity 140 performs a similar function as reference cavity 40. However, reference cavity 140 is defined, not only by reference holder 20, but also insert 128, and optionally reference plug 141. Optional reference plug 141 is configured to close open end 148.

As illustrated in FIG. 7, insert 128 divides sample cavity 130 from reference cavity 140. As shown in FIG. 8, measured system 112 is configured to insert and remove (i.e. load and unload) sample 32 (FIG. 3) and reference 34 (FIG. 3) from opposite open ends 146 and 148 respectively.

Measured system 112 is configured to hold sample 32 (FIG. 3) within sample cavity 130. Similarly reference 34 is configured to be held within reference cavity 140. Sample holder 18, insert 128, and reference holder 20 are configured to be inserted within or removed from cell cavity 16. Plugs 131 and 141 can be removed to expose sample cavity 130 and reference cavity 140. Sample 32 and reference 34 are configured to be either inserted or removed through open ends 146 or 148. This arrangement allows for an increased number of heat sensors 24, which increases the sensitivity of measuring system 112. It is also envisioned that the arrangement of measured system 112 allows for the insertion and removal of sample 32 and reference 34, without disassembly of portions of measured system 112, such as heat sensors 24.

In operation, measured system 12, 112 is configured to operate with any calorimeter, such as calorimeter 10 (FIG. 3). Moreover, measured system 12, 112 is configured to be used as a typical cell of calorimeter 10. Calorimeter 10 may use measured system 12, 112 as part of any calorimetry application. A calorimetry application includes the steps of adding sample 32 within sample holder 18 and adding reference 34 within reference holder 20. Then sample holder 18 and reference holder 20 are added, as a typical cell, into calorimeter 10.

As detailed herein in connection with certain illustrative embodiments, sample 32 and reference 34 are illustratively loaded into sample holder 18 and reference holder 20, respectively, by being inserted through opening 46. Reference 34 is illustratively loaded first and passed through the opening 38 of the separator 26 into reference holder 20. Insert 28 is then passed through opening 46 and coupled to the separator 26 before sample 32 is loaded into sample holder 18. Calorimeter 10 can be used to measure the temperature changes within sample holder 18 and reference holder 20. Each of sample holder 18 and reference holder 20 provide values which gives information on whether energy has been release or absorbed. Comparisons between the corresponding values for sample holder 18 and reference holder 20 provide information regarding the analyte of the sample 32.

While this disclosure has been described as having an exemplary design, the present disclosure may be further modified within the spirit and scope of this disclosure. This application is therefore intended to cover any variations, uses, or adaptations of the disclosure using its general principles. Further, this application is intended to cover such departures from the present disclosure as come within known or customary practice in the art to which this disclosure pertains.

What is claimed is:

1. A measured system for use with a calorimeter, comprising:
    a cell defining a cell cavity having a longitudinal axis;
    a heat sensing module configured to be located within the cell cavity, the heat sensing module including a support and a heat sensor operably coupled to the support;
    a sample holder configured to be located within the cell cavity, the sample holder defining a sample cavity configured to hold a sample;
    a reference holder configured to be located within the cell cavity, the reference holder defining a reference cavity configured to hold a reference;
    a separator configured to be located longitudinally between the sample holder and the reference holder, the separator defining a separator opening, the reference being configured to pass through the separator opening; and
    an insert configured to be removably supported within the separator opening.

2. The measured system of claim 1 wherein the cell, the sample holder, and the reference holder are each made of a heat conductive material.

3. The measured system of claim 1, wherein the heat sensing module includes a support including an inner surface and an outer surface, the outer surface configured to be located adjacent to the inner surface of the cell.

4. The measured system of claim 3 wherein the support is configured to substantially extend a longitudinal length of the cell.

5. The measured system of claim 3 wherein the heat sensor has a generally cuboid shape.

6. The measured system of claim 3 wherein the heat sensing module includes a plurality of heat sensors operably coupled to support the heat sensing module.

7. The measured system of claim 6 wherein a first set of the plurality of heat sensors is adjacent to the sample holder, wherein a second set of the plurality of heat sensors is adjacent to the reference holder.

8. The measured system of claim 1 wherein the sample, the reference, and the insert are each removable from the cell cavity.

9. The measured system of claim 1, wherein the cell, the sample holder, the reference holder, and the insert each has a generally cylindrical shape.

10. The measured system of claim 1, wherein the sample holder, the reference holder, and the separator are an integral unit.

11. The measured system of claim 1, wherein the separator defines an outer surface, at least a first portion of the outer surface of the separator adjacent to an internal wall of the cell, at least a second portion of the outer surface of the separator adjacent to the heat sensing module.

12. The measured system of claim 1, wherein the separator and the insert are thermal insulators.

13. A measured system for use with a calorimeter, comprising:
    a cell having a longitudinal axis;
    a sample holder configured to be positioned along said longitudinal axis, the sample holder defining a sample cavity configured to hold a sample, the sample configured to be measured by the calorimeter;
    a reference holder configured to be positioned along the longitudinal axis, the reference holder defining a reference cavity configured to hold a reference;
    a separator configured to be located longitudinally between the sample holder and the reference holder, and configured to provide thermal insulation between the sample holder and the reference holder;
    at least one heat sensing module configured to be supported within the cell holder, the at least one heat sensing module including a heat sensor laterally spaced from the longitudinal axis; and
    an insert configured to be positioned along the longitudinal axis within a cavity of the separator.

14. The measured system of claim 13, wherein the cell defines an open end.

15. The measured system of claim 13, wherein the sample holder, the reference holder, and the insert are an integral unit.

16. The measured system of claim 13, wherein at least a portion of the separator is adjacent to an internal wall of the cell.

17. The measured system of claim 13, wherein the at least one heat sensing module includes a first heat sensing module and second heat sensing module.

18. The measured system of claim 17, wherein the first heat sensing module is intermediate the cell and the sample holder.

19. The measure system of claim 17, wherein the second heat sensing module is intermediate the cell and the reference holder.

20. The measure system of claim 13, wherein the heat sensor is supported by an inner surface of the cell.

21. A method of using a measured system with a calorimeter, the method comprising the steps of:
- providing a cell having a longitudinal axis, the cell defining an open end;
- providing a thermally insulating separator within the cell;
- loading a reference through the open end of the cell by moving the reference along the longitudinal axis;
- loading a sample through the open end of the cell by moving the sample along the longitudinal axis;
- measuring thermal characteristics of the sample by the calorimeter; and
- loading a thermally insulating insert through the open end of the cell by moving the insert along the longitudinal axis, and receiving the insert within an opening defined by the separator.

22. The method of claim 21, wherein the cell defines a cell cavity extending from the open end along the longitudinal axis.

23. The method of claim 21, further comprising the step of loading a reference holder and a sample holder through the open end of the cell, the separator being disposed intermediate the reference holder and the sample holder.

24. The method of claim 23, further comprising the step of loading the sample within the sample holder.

25. The method of claim 23, further comprising the step of loading a reference within the reference holder.

26. The method of claim 23, wherein the sample holder, the reference holder, and the separator are an integral unit.

27. The method of claim 23, wherein the step of measuring a sample includes providing a heat sensor laterally offset from the longitudinal axis and thermally coupled to the sample holder, and measuring temperature changes through the heat sensor.

28. The method of claim 27, further comprising the step of coupling the insert to the separator.

29. A method of using a measured system with a calorimeter, the method comprising the steps of:
- providing a cell having a longitudinal axis, the cell defining an open end;
- providing a thermally insulating separator within the cell;
- loading a reference through the open end of the cell by moving the reference along the longitudinal axis;
- loading a sample through the open end of the cell by moving the sample along the longitudinal axis; and
- measuring thermal characteristics of the sample by the calorimeter
- wherein the step of loading a reference includes passing the reference through an opening of the separator.

* * * * *